United States Patent
Wyttenbach et al.

(10) Patent No.: US 9,433,910 B2
(45) Date of Patent: Sep. 6, 2016

(54) SOLID/HEAT-TRANSFER GAS REACTOR COMPRISING GAS DIFFUSERS WITH REDUCED RISKS OF BLOCKING

(75) Inventors: Joel Wyttenbach, Thoiry (FR); Philippe Papillon, Chambery (FR); Gwennyn Tanguy, Le Bourget du Lac (FR)

(73) Assignee: Commissariat a l'energie atomique et aux energies alternatives, Paris (FR)

( * ) Notice: Subject to any disclaimer, the term of this patent is extended or adjusted under 35 U.S.C. 154(b) by 484 days.

(21) Appl. No.: 14/113,958

(22) PCT Filed: Apr. 27, 2012

(86) PCT No.: PCT/EP2012/057732
§ 371 (c)(1),
(2), (4) Date: Oct. 25, 2013

(87) PCT Pub. No.: WO2012/150185
PCT Pub. Date: Nov. 8, 2012

(65) Prior Publication Data
US 2014/0050658 A1 Feb. 20, 2014

(30) Foreign Application Priority Data
May 3, 2011 (FR) .................... 11 53781

(51) Int. Cl.
*B01J 8/02* (2006.01)
*F28C 3/12* (2006.01)
*B01J 15/00* (2006.01)
*B01J 19/24* (2006.01)

(52) U.S. Cl.
CPC ............. *B01J 8/0242* (2013.01); *B01J 8/0207* (2013.01); *B01J 8/0278* (2013.01); *B01J 8/0285* (2013.01); *B01J 8/0292* (2013.01); *B01J 15/00* (2013.01); *B01J 15/005* (2013.01); *B01J 19/249* (2013.01); *B01J 2208/0084* (2013.01); *B01J 2208/00707* (2013.01); *B01J 2208/00911* (2013.01);
(Continued)

(58) Field of Classification Search
CPC ........ B01J 8/021; B01J 8/025; B01J 8/0242; B01J 8/0207; B01J 8/0278; B01J 8/0292; B01J 19/249; B01J 19/305; B01J 2208/00707; B01J 2208/0084; B01J 2208/00884; B01J 2208/00893; B01J 2208/00911; B01J 2208/00938; B01J 2219/2453; B01J 2219/2458; B01J 2219/247; B01J 2208/2481; B01J 2219/2496; F28C 3/12
See application file for complete search history.

(56) References Cited

U.S. PATENT DOCUMENTS 2,204,447 A * 6/1940 Samans .................... B01J 8/025
165/140
2,961,304 A 11/1960 Collins
(Continued)

FOREIGN PATENT DOCUMENTS

| WO | 02 20149 | 3/2002 |
| WO | 02 051538 | 7/2002 |
| WO | 2009 062695 | 5/2009 |

OTHER PUBLICATIONS

International Search Report Issued Aug. 7, 2012 in PCT/EP12/057732 Filed Apr. 27, 2012.
(Continued)

*Primary Examiner* — Lessanework Seifu
(74) *Attorney, Agent, or Firm* — Oblon, McClelland, Maier & Neustadt, L.L.P.

(57) ABSTRACT

A module for a solid/heat-transfer gas reactor, including a plurality of diffusers each including a top portion supporting the solid reagent, and a portion for diffusing reactive/heat-transfer gas, situated under the top portion.

9 Claims, 4 Drawing Sheets

(52) U.S. Cl.
CPC ... *B01J2219/247* (2013.01); *B01J 2219/2453* (2013.01); *B01J 2219/2458* (2013.01); *B01J 2219/2481* (2013.01); *B01J 2219/2496* (2013.01); *F28C 3/12* (2013.01)

(56) References Cited

U.S. PATENT DOCUMENTS 3,592,613 A  7/1971  Boyd

| | | |
|---|---|---|
| 2003/0217543 A1 | 11/2003 | Yoshida et al. |
| 2004/0191592 A1 | 9/2004 | Kamachi et al. |
| 2010/0012740 A1 | 1/2010 | Paulus et al. |

OTHER PUBLICATIONS

U.S. Appl. No. 14/113,958, filed Oct. 25, 2013, Wyttenbach, et al.
U.S. Appl. No. 14/123,524, filed Dec. 3, 2013, Wyttenbach, et al.

\* cited by examiner

SOLID/HEAT-TRANSFER GAS REACTOR COMPRISING GAS DIFFUSERS WITH REDUCED RISKS OF BLOCKING

The invention relates to the field of solid/heat-transfer gas reactors, in which a chemical or physical reaction between a solid and a gas is provided, such as for example a thermochemical reaction or a physical adsorption/desorption reaction. In this type of reactor, the gas coming from an external circuit serves as a heat transfer medium, the heat exchange then taking place by convection during the endothermic/exothermic reaction.

Such a reactor is generally loaded with a solid reagent, taking the form of a pure or composite granular bed, resting on a horizontal grid. A flow of reactive heat-transfer gas is applied so as to pass through the bed of reactive solid, with a descending vertical direction. The gas then diffuses downwards in the granular bed, by virtue of the porosity of the grains.

Nevertheless, this configuration is subject to the soiling of the grid which, in the long term, may lead to the entire blocking of the cross sections of flow of the heat-transfer gas. This is explained by the fact that, when the reactor is functioning, the reactive solid swells and then shrinks during the two reciprocal reactions. The repetition of these changes in volumes gives rise to risks of fragmentation of the grains which, because of the descending vertical gas flow, are then entrained towards the grid, which they gradually block. Such blocking is obviously to be proscribed, since it may impair the correct functioning of the reactor.

Moreover, the reactors of the prior art with stacked modules have a design that is open to improvement.

To deal with these problems, the subject matter of the invention is a solid/heat-transfer gas reactor according to claim 1.

The invention is first of all remarkable in that it provides a design dedicated to an ascending irrigation of the reactive solid by the heat-transfer gas. This first aspect leads to a significant reduction in the risk of blocking of these diffusers. The favourable direction of the gas flow in fact reduces the migration of the reactive solid in the direction of the diffusers.

Consequently the design of the reactor module according to the invention improves its functioning and greatly reduces or even entirely eliminates the maintenance requirements for the diffusers.

To decrease even further the risks of blocking of the diffusers, it is ensured that, in vertical projection on a horizontal plane, said top support portion of the solid entirely covers said diffusion portion of the gas.

For example, each diffuser takes the form of a cylindrical stud at least part of the lateral surface of which, and preferably the whole thereof, constitutes said diffusion portion of the gas. Thus the diffusion of the heat-transfer gas then takes place in all the planes parallel to the axis of the stud. It may be a cylindrical stud with a square, rectangular, circular, triangular, etc. cross section.

According to the invention, each module comprises a double wall between which the gas is intended to circulate before penetrating through said diffusers, the latter projecting upwards from the top wall of said double wall. The space defined between the two walls of the double wall enables all the diffusers communicating with this space to be fed evenly.

This double wall, preferably oriented horizontally, that is to say orthogonally to the vertical diffusers, preferably forms a double bottom of the module. In an alternative configuration, the double wall could be placed at the head of the module, and thus constitute the bottom of a housing cavity defined by another module placed above it.

According to the invention, each module comprises a lateral channel for distribution of the gas, as well as a lateral channel for collecting the gas. The integration of these channels advantageously procures a very compact design.

Preferably, said diffusers are provided with a density of 75 to 150 diffusers/$m^2$. This high density enables the gas emerging from the diffusers to pass through the reactive solid very evenly, which promotes the heat and mass exchanges between the solid and gaseous reagents. The counterproductive phenomenon of spontaneous creation of preferential channels in the solid reagent is greatly limited by this even distribution of the gas through the diffusers, preferably distributed in the horizontal section.

The module is preferably produced from three metal sheets bent and fixed to one another, as well as by means of the diffusers. This procures great ease of manufacture of the module.

Still according to the invention, the solid/heat-transfer gas reactor comprises a plurality of modules stacked in the vertical direction.

The modularity of the reactor facilitates the manufacture and installation thereof. In addition, its sizing may easily be adapted to the requirements encountered by adjusting the number of modules to be stacked, these stages preferably all being identical. In addition, any two directly consecutive modules in the stack define a housing cavity designed to receive a solid reagent intended to be carried at least partially by said diffusers arranged in this cavity. In order to facilitate the variations in volume of the reactive solid, provision is preferentially made to leave an unfilled dead space between the top part of the bed of solid reagent of a module and the surface of the double bottom of the immediately higher module. In fact, the cavity of each module is only partially filled with solid reagent.

The design proposed makes it possible to obtain a very high density of solid reagent in the reactor. In addition, when the modules are closed towards the bottom by the double wall and open towards the top, the housing cavity defined by this module is therefore open towards the top and thus easily allows the changes in volume of the solid reagent based in this cavity. The design of the module consequently proves to be entirely suitable for withstanding the two reciprocal chemical/physical reactions.

Furthermore, said lateral gas distribution channels of the stacked modules form together a vertical distributor supplying gas to each of the spaces defined between the two walls of the double walls, and said lateral gas-connection channels of the stacked modules form together a vertical collector collecting the gas coming from each of said housing cavities. The reactor then has a particularly compact appearance.

Preferably, the reactor comprises means for bringing gas into the reactor, as well as means for discharging the gas out of the reactor. Because of the heat-transfer function fulfilled by the gas, the latter is brought and extracted through an external circuit and therefore does not circulate in closed circuit in the reactor.

Another subject matter of the invention is a solid/heat-transfer reaction method implemented by means of a reactor as mentioned above. In this method, solid reagents are placed in each of said housing cavities, and the reactive heat-transfer gas is introduced into the distributor by means of said gas-feed means. In addition, after this gas passes through the solid reagents, said gas enters the collector of the reactor before being discharged from the latter through said gas-discharge means.

Preferably, the solid reagents are pure unstructured granular reagents. Pure granular reagent means a reagent not containing any structuring agent or catalyst. In the invention, the use of these pure reagents is enabled because of the architecture of the cavity of the module, thus making it possible to increase the energetic density of the complete reactor.

Finally, with the present invention, it is possible to arrange solid reagents of different natures in said housing cavities of the reactor. Alternatively, it is possible, within the same cavity, to introduce a mixture of reactive solids.

In particular, it is possible to organise the layer of solid reagent with a first layer of reactive solid of a first nature in contact with the surface of the double bottom, and a second layer, arranged on the first layer, of a second reactive solid different from the first. For example, the first layer may consist of pure reagents, and the second layer of structured composite reagents.

Other advantages and features of the invention will emerge from the following non-limitative detailed description.

This description will be given with regard to the accompanying drawings, among which:

Figure 1:
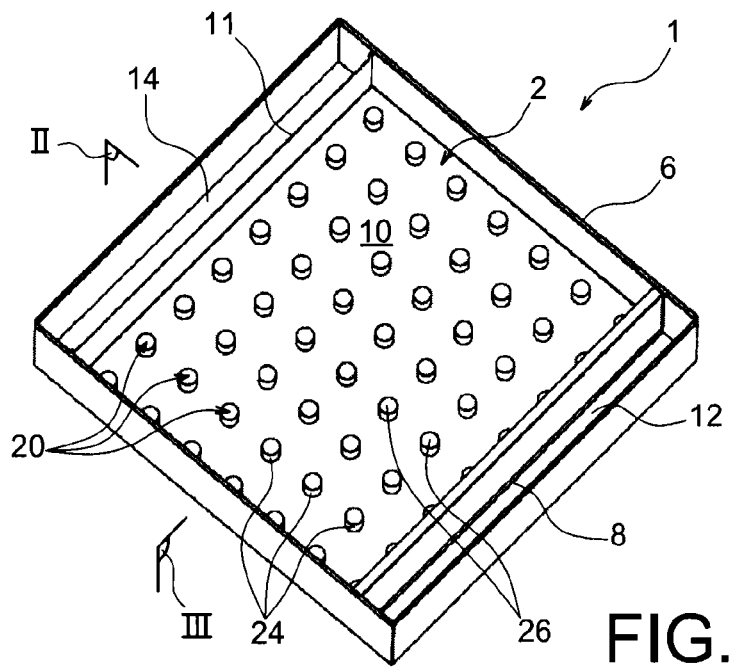
FIG. 1 shows a perspective view of a solid/heat-transfer gas reactor module according to a preferred embodiment of the present invention.
Figure 2:
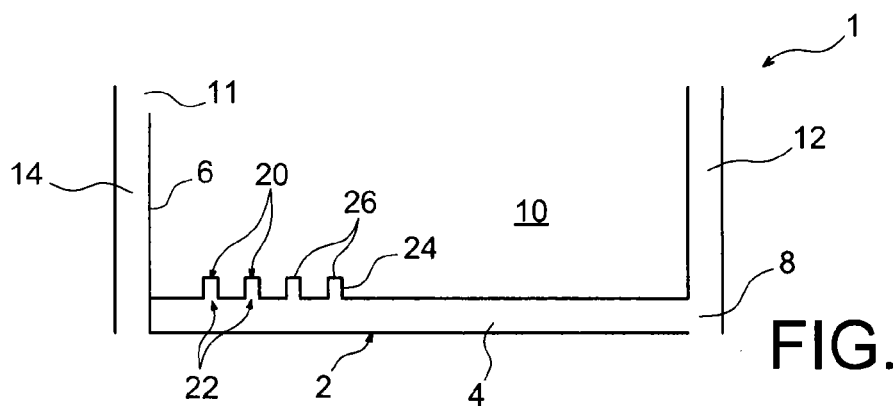
FIGS. 2 and 3 are views in cross section of the module of the previous figure, taken respectively along the planes II and III.
Figure 3:
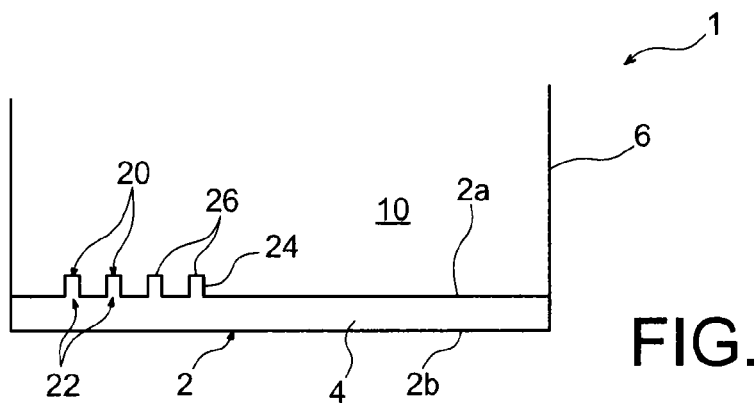

With reference to FIGS. 1 to 3, a module is shown of a solid/heat-transfer gas reactor, according to a preferred embodiment of the invention.

This module 1, parallelepipedal in shape overall, comprises first of all a double wall 2 forming a double bottom of the module. The two walls 2a, 2b are parallel, spaced apart from each other so as to define a free space 4 between them. The walls 2a, 2b, intended to be arranged horizontally, when the module is situated in a reactor, are surrounded by a frame 6 following the contour of the double bottom 2. It therefore has a square or rectangular shape and extends vertically from the double bottom 2. More precisely, three of the four walls of the frame 6 extend from the bottom wall 2b matching top wall 2a, while the fourth wall extends only from the top wall 2a. Thus the space defined by the double bottom 2 is closed at three lateral faces, only the fourth lateral face remaining open so as to define an inlet 8 through which gas can enter in the space 4.

In addition, the second wall opposite to the fourth wall mentioned above and extending from the top wall 2a has height less than that of the other three walls of the frame 6. As will be detailed below, this defines an outlet 11 through which gas can escape from the housing cavity 10, defined by the frame 6 and the double bottom 2.

The module 1 also comprises a lateral gas-distribution channel 12, defined partly by said fourth wall of the frame 6. This channel 12, rectangular in shape overall, has a length substantially identical to that of this fourth wall. Likewise, the module comprises a lateral gas collection channel 14, defined partly by said second wall of the frame 6. This channel 14, also rectangular in shape overall, has a length substantially identical to that of this second wall.

These two channels 12, 14, completely running across in the vertical direction, are therefore arranged in an opposite manner, on either side of the double wall 2.

The reactor module also comprises a plurality of diffusers 20 arranged in the housing cavity 10, projecting vertically from the top wall 2a of the double bottom. By way of indication, these diffusers 20 can be fixed in orifices 22 formed through the top wall 2a, as can be seen in FIGS. 2 and 3. A gasket may be provided between the orifices and the diffusers that they receive. Alternatively, welding or brazing may also be envisaged, simultaneously providing the assembly of the diffusers 20. Nevertheless, when the gasket solution is adopted, the diffusers are fixed only by their tight fit in their respective orifices 22.

Here the diffusers 20 each take the form of a cylindrical stud with a circular cross section, the vertically oriented cylindrical lateral wall of which constitutes a gas-diffusion portion 24, the top end of which is closed off by a horizontal portion 26 supporting a reactive solid. This portion 26, in the form of a horizontal disc, is in fact designed to support the solid reagent intended to be housed in the cavity 10, as will be detailed below.

Figure 4A:
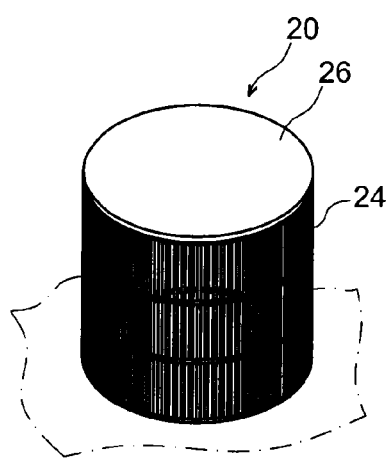
FIGS. 4a and 4b are examples of diffusers equipping the module shown in the previous figures.
Figure 4B:
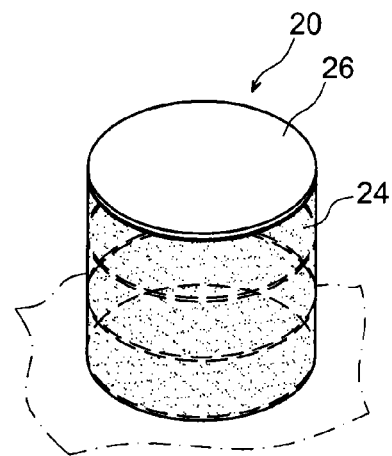

FIG. 4a shows a first example of a diffuser 20 the vertically oriented cylindrical lateral wall of which, constituting the gas-diffusion portion 24, takes the form of a self-supporting grid. In the other example shown in FIG. 4b, this portion 24 is a filtering metal fabric with a metal carrier structure. It offers an excellent compromise between fineness of filtration and pressure drops.

Nevertheless, other diffuser designs may be adopted by a person skilled in the art without departing from the scope of the invention. In all cases these diffusers are open at the bottom end in order to communicate with the space 4 defined by the double bottom 2.

These diffusers 20 are distributed uniformly, for example in rows and columns, with a density of around to 150 points/m$^2$. The filtration pitch of these diffusers is for example around 50 to 100 µm, while their diameter is preferentially between 5 and 40 nm. For example, they may have substantially identical heights. This height may be between 5 and 45 mm, with a height of solid reagent of around 50 mm.

Still with regard to sizing, the height of the space 4 of the double bottom 2 is around 5 to 30 mm. This dimension therefore also corresponds to the height of the inlet 8, and also preferentially to the height of the outlet 11.

The two walls 2a, 2b have a thickness of around 0.3 to 3 mm, and are produced from stainless steel, for example 316L stainless steel, or are produced from thermoformed polymer. The walls defining the frame 6 and the external contour of the channels 12, 14 may also be produced from these materials, optionally being equipped with stiffeners, such as ribs, in order to improve the mechanical strength of the module.

The length of the module 1, in the direction including the channels 12, 14, may be approximately 1200 mm, with a width of 800 mm and a height of 60 to 120 mm, making it possible to receive a reactive solid 50 mm high. As for the width of the channels 12, 14, this is around 40 mm, and their length substantially identical to the width of the module, as mentioned above.

Figure 5:
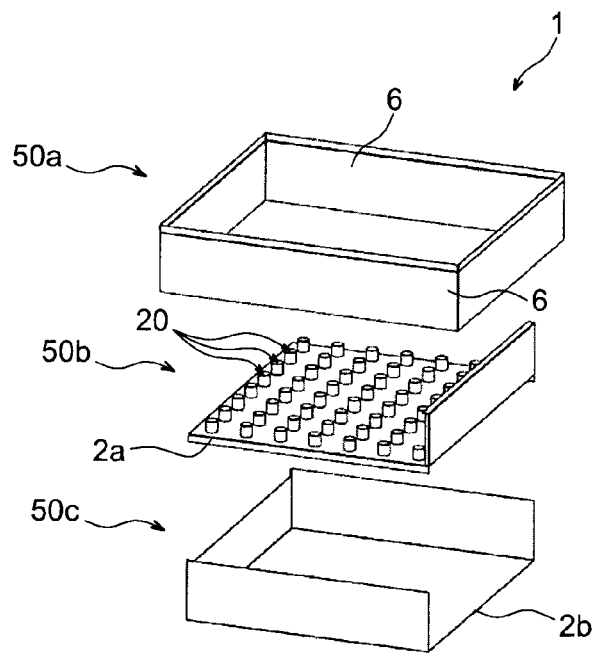
FIG. 5 is an exploded view showing the various bent metal sheets making up the module.
Figure 6:
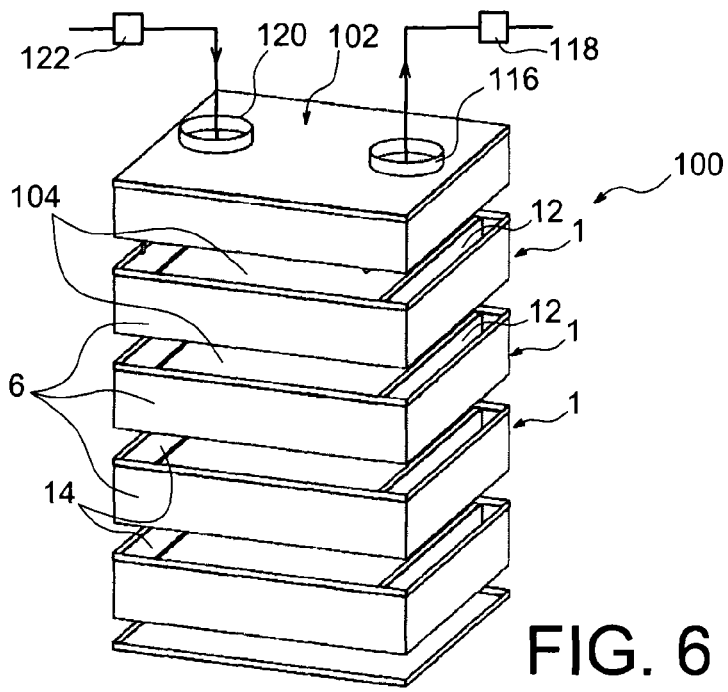
FIG. 6 shows an exploded view in perspective of a reactor comprising a plurality of modules like the one shown in the previous figures.
Figure 7:
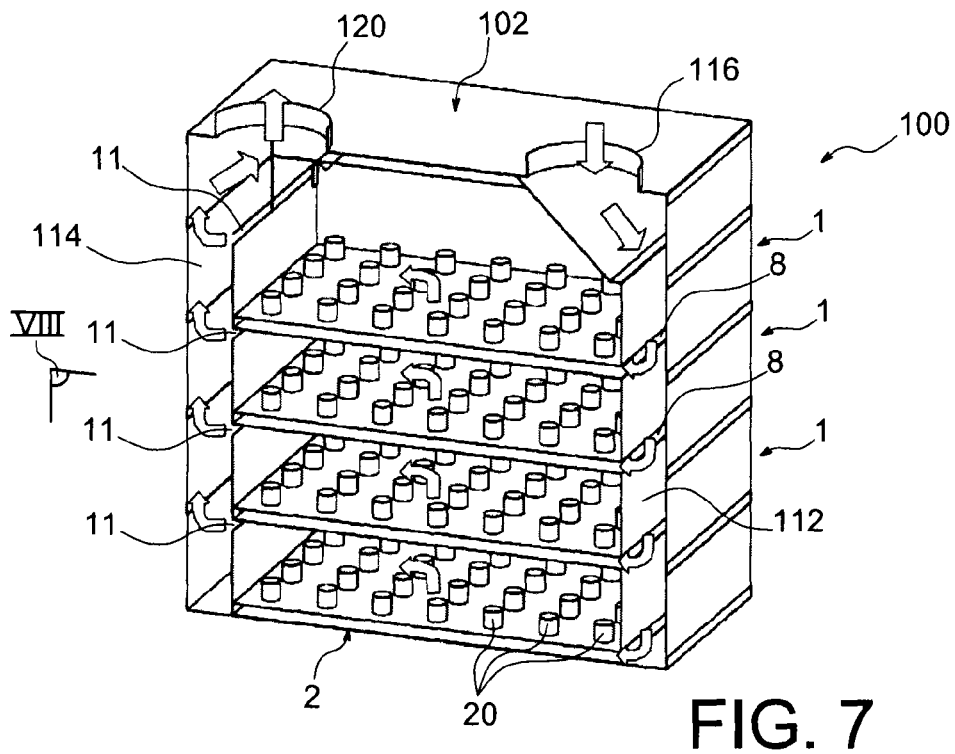
FIG. 7 is another perspective view of a half of the reactor, cut along a vertical mid-plane.
Figure 8:
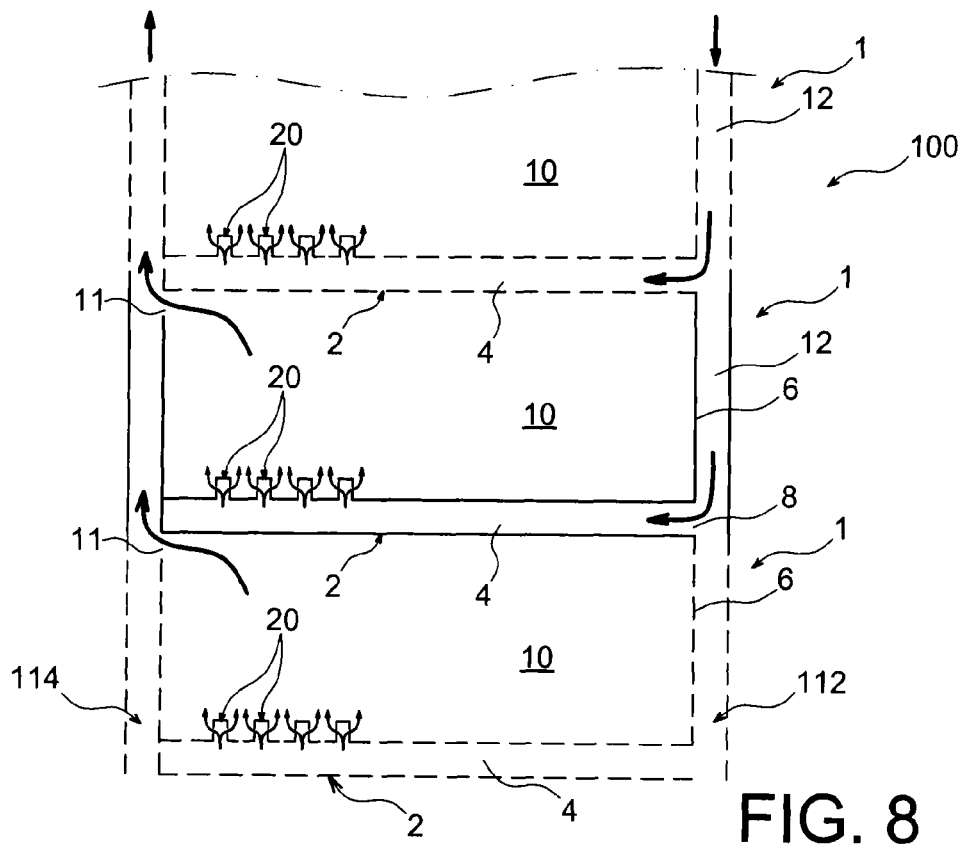
FIG. 8 is a view in section of the reactor of the previous figure, taken along the plane VIII.
Figure 9:
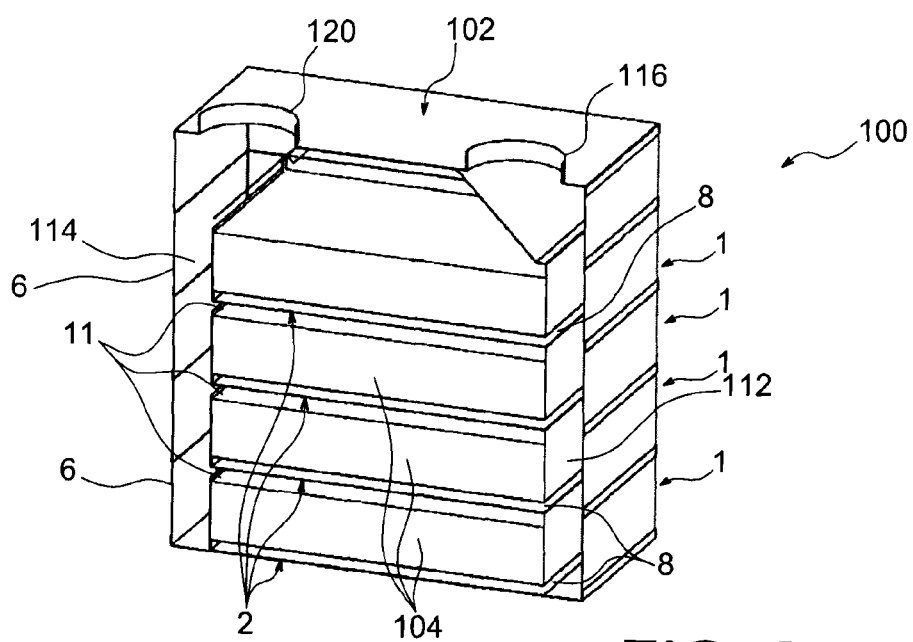
FIG. 9 is a view similar to the one in FIG. 7, with the reactor equipped with solid reagents.

With reference to FIG. 5, three bent metal sheets 50a, 50b, 50c are shown, constituting, when they are assembled, the structure of the module 1, only the diffusers 20 then having to be implanted on the top wall 2a of the double bottom 2.

With reference now to FIGS. 6 to 9, a solid/heat-transfer gas reactor 100 is shown, formed by means of a plurality of modules 1 stacked one on top of the other, in the vertical direction. They are for example four stacked modules 1 covered with a closure piece 102 enabling the reactive/heat-transfer gas to arrive and leave.

When the modules 1 are stacked, the cavity 10 of each module is closed towards the top by the double bottom 2 of the directly higher module. The walls forming the frames 6 of the two modules concerned therefore sealingly close this cavity 10, which remains covered only at the gas outlet 11 situated between the two frames 6. Each cavity 10 receives a solid reagent 104, for example parallelepipedal, with a shape complementary to that of its cavity. This reagent 104, in the form of a pure granular bed, rests on the top ends 26 of the diffusers 20, and matches each of the four walls of the frame 6 delimiting the cavity 10. The reagent may also be penetrated by the diffusers 20, until it is optionally also partly carried by the top surface 2a of the double bottom 2.

In addition the gas-distribution channels 12 of the stacked modules form together a vertical gas distributor 112, supplied with gas through an inlet orifice 116 provided on the head piece 102, this same orifice 116 being connected to means 118 for bringing gas into the reactor 100, belonging to an external circuit. The distributor 112 therefore conveys vertically, sealingly, over substantially the entire height of the reactor, communicating with the gas inlets 8 giving access to the spaces 4 provided in the double bottoms 2.

In a similar manner, the gas-collection channels 14 of the stacked modules form together a vertical gas collector 114, extended upwards by an outlet orifice 120 provided on the head piece 102, this same orifice 120 being connected to means 122 for discharging gas out of the reactor 100, belonging to the external circuit. The collector 114 therefore conveys vertically, sealingly, over substantially the entire length of the reactor, communicating with the gas outlets 11.

In operation, the reactive solids 104 are therefore arranged in the cavities 10, with a height adapted so as not to close off the gas outlets 11. These solids, in the form of pure granular beds, can be produced from the following materials: strontium bromide $SrBr_2$, sodium metasilicate $Na_2SiO_3$, ammonium alum $NH_4Al(SO_4)_2$, potassium alum $KAl(SO_4)_2$, or any other reactive solid deemed to be favourable for the solid/heat-transfer gas thermochemical reactions. The typical value of the density of this reactive solid is around 70 $kg/m^2$. In this regard, it should be noted that the reactor may be equipped with different solids according to the stage, or within the same stage.

Next, the gas feed means 118 introduce reactive/heat-transfer gas into the reactor, via the inlet orifice 116, which then conducts this gas to the distributor 112. The latter then supplies each of the spaces 4 of the double bottoms 2, via the gas inlets 8. The gas next enters through the diffusers 20, then passes through the solids 104 by virtue of the porosity of the agglomerated grains. It is during this passage through the solids that the chemical/physical reactions occur, enabling the gas, for example moist air at atmospheric pressure, to be heated or cooled. The heat-transfer gas emerging from the solids 104 then joins the collector 114 via the outlets 11 in order then to be discharged by the means 122, via the outlet orifice 120.

Naturally various modifications can be made by persons skilled in the art to the invention that has just been described solely by way of non-limitative examples.

The invention claimed is:

1. A solid/heat-transfer gas reactor comprising:
   a plurality of modules stacked in a vertical direction, comprising solid reagents configured to have the heat-transfer gas pass through them;
   wherein each module comprises a plurality of diffusers each including a top portion supporting one of the solid reagents, and a portion for diffusing reactive/heat-transfer gas, situated under the top support portion, and comprising a lateral gas-distribution channel, and a lateral gas-collection channel,
   each module further comprising a double wall between which the gas is configured to circulate before entering through the diffusers, the diffusers projecting upwards from a top wall of the double wall, and wherein any two directly consecutive modules in the stack define a housing cavity receiving one of the solid reagents carried at least partially by the diffusers arranged in the cavity,
   the lateral gas-distribution channels of the stacked modules forming together a vertical distributor supplying gas to each of spaces defined between two walls of the double walls, and
   wherein the lateral gas-collection channels of the stacked modules form together a vertical collector collecting the gas coming from each of the housing cavities.

2. A reactor according to claim 1, wherein, in vertical projection onto a horizontal plane, the top portion supporting the solid reagents entirely covers the gas-diffusion portion.

3. A reactor according to claim 1, wherein each diffuser takes a form of a cylindrical stud of which at least part of the lateral surface constitutes the gas-diffusion portion.

4. A reactor according to claim 1, wherein, on each module, the diffusers are provided with a density of 75 to 150 diffusers/$m^2$.

5. A reactor according to claim 1, wherein each module is produced from three bent metal sheets fixed to one another, and by the diffusers.

6. A reactor according to claim 1, further comprising means for bringing gas into the reactor, and means for discharging gas out of the reactor.

7. A solid/heat-transfer gas reaction method implemented by a reactor according to claim 6, comprising:
   placing the solid reagents in each of the housing cavities;
   introducing the heat-transfer reactive gas into the distributor by gas-feed means; and
   after the gas passes through the solid reagents, the gas enters a collector of the reactor before being discharged from the collector by the gas-discharge means.

8. A method according to claim 7, wherein the solid reagents are unstructured pure granular reagents.

9. A method according to claim 7, wherein solid reagents of different natures are arranged in the housing cavities of the reactor.

* * * * *